United States Patent
Ortiz et al.

(10) Patent No.: US 9,935,390 B2
(45) Date of Patent: Apr. 3, 2018

(54) TAMPER-RESISTANT CONNECTOR ARRANGEMENT

(71) Applicant: MANN+HUMMEL GMBH, Ludwigsburg (DE)

(72) Inventors: Gabriel Ortiz, Querétaro (MX); Daniel Livingston, Marshall, MI (US); Juergen Kosicki, Erligheim (DE); Patrick Dietmann, Stuttgart (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 717 days.

(21) Appl. No.: 14/510,692

(22) Filed: Oct. 9, 2014

(65) Prior Publication Data
US 2016/0104964 A1 Apr. 14, 2016

(51) Int. Cl.
*F16L 37/107* (2006.01)
*H01R 13/447* (2006.01)

(52) U.S. Cl.
CPC .......... *H01R 13/447* (2013.01); *F16L 37/107* (2013.01)

(58) Field of Classification Search
CPC .... H01R 13/447; F16L 37/107; F16L 37/252; F16L 37/248
USPC .............................. 285/402, 376, 377, 86, 91
See application file for complete search history.

(56) References Cited

U.S. PATENT DOCUMENTS

| | | | | |
|---|---|---|---|---|
| 69,706 A | * | 10/1867 | Roberts ................. | F16L 37/248 285/377 |
| 807,417 A | * | 12/1905 | Caskey ................. | F16L 37/113 285/377 |
| 828,243 A | * | 8/1906 | Polmann ............... | F16L 37/107 285/376 |
| 915,985 A | * | 3/1909 | Medovarski .......... | F16L 37/252 285/376 |
| 966,925 A | * | 8/1910 | Kittredge .............. | F16L 37/248 285/85 |
| 980,677 A | * | 1/1911 | Rhoads ................. | F16L 37/252 285/86 |
| 1,011,284 A | * | 12/1911 | Utz et al. .............. | F16L 37/252 285/376 |
| 1,885,321 A | * | 11/1932 | Benn ..................... | F16L 37/248 285/361 |
| 2,076,918 A | * | 4/1937 | Robison ................ | F16L 37/248 285/82 |
| 2,248,701 A | * | 7/1941 | Fowler .................. | F16L 37/107 285/376 |

(Continued)

*Primary Examiner* — David E Bochna
(74) *Attorney, Agent, or Firm* — James Hasselbeck (57) ABSTRACT

A connector assembly is disclosed for making a connection between a tubular adapter component and a port connector which, once connected to each other, are not able to be disassembled. At least one of the tubular adapter component or the port component may have at least one cutout section and the other may have a projecting tab. A tubular sleeve is positioned on the port component and is non-rotatable and non-removable from the port component. The tubular sleeve has at least one flexible cam locking post. When the adapter component is slidably engaged with the port component the cutout section and the projecting tab engage to prevent sliding withdrawal of the adapter component from the port component. The flexible cam locking post also engages with the cutout section and prevents the adapter component from rotating.

19 Claims, 6 Drawing Sheets

(56) References Cited

U.S. PATENT DOCUMENTS 5,741,084 A * 4/1998 Del Rio ............. A61B 17/1633
285/402

* cited by examiner

TAMPER-RESISTANT CONNECTOR ARRANGEMENT

FIELD

The present teachings generally relates to a tamper-resistant connector assembly. More particularly, the present teachings relate to a multi-component, tamper-resistant connector assembly where the component parts of the connector assembly can be quickly and easily connected together with a locking action, and thereafter the component parts of the connector will not be separable or otherwise subject to disassembly. In one particular application, the present teachings relate to a tamper-resistant connector arrangement for coupling a heated port with a clean side duct assembly of a motor vehicle emissions circuit.

BACKGROUND

This section provides background information related to the present disclosure which is not necessarily prior art.

Connector assemblies are used in a wide variety of applications, and particularly in connection with automotive engines to secure different types of hoses to each other or to other ducts. Often such connectors must be resistant to relatively high temperatures and also must be able to be installed quickly and easily, since in many instances such connectors must be installed by individuals operating on an assembly line.

In some applications it would also be highly desirable to provide a connector which, once its components parts are secured together, is not able to be disassembled. This is especially so if the connector is associated with use on motor vehicle emissions equipment. In such instances there is a strong desire by both manufacturers and governmental bodies that connectors used to help form an emissions circuit for a motor vehicle engine are not readily disconnected or capable of being disassembled by the vehicle owner.

There is also a need for a connector assembly which is able to be easily, permanently secured to another plastic duct component, for example to a polypropylene duct used in a vehicle emission system. There is a further need for such a connector assembly that permits one of its subcomponents to be permanently secured to the plastic duct component without compromising its ability to make a tamper-resistant connection between two or more of its subcomponents, and without significantly complicating the design of the overall connector assembly. There is a further need for such a tamper-resistant connector assembly which can be constructed in a highly cost effective manner with a relatively small number of independent component parts, and which can be assembled quickly without any special tools by an assembly technician and, when once assembled, cannot be disassembled. Still further, there is a need for having a high temperature resistance material (e.g., Polyamide) on the heated port side of a connector assembly, and the need to have this welded to a different material duct (e.g., Polypropylene), which are not compatible for plastic welding, and which would otherwise require adaptor pieces in order to be implement the connector assembly.

SUMMARY

This section provides a general summary of the disclosure, and is not a comprehensive disclosure of its full scope or all of its features.

In one aspect the present disclosure relates to a connector assembly. The connector assembly may comprise a port component having a main body portion. A tubular adapter component may be included. At least one of the tubular adapter component or the port component may have at least one cutout section and the other may have a projecting tab. A tubular sleeve may be positioned on an end portion of the port component and is non-rotatable and non-removable relative to the port component. The tubular sleeve may include at least one flexible cam locking post projecting from a wall portion thereof. When the adapter component is slidably engaged with the port component, the at least one cutout section and the projecting tab prevent sliding withdrawal of the adapter component from the port component. The at least one flexible cam locking post also engages with the at least one cutout section to prevent rotational movement of the adapter component relative to the port component, thus preventing removal of the adapter component from the port component.

In another aspect the present disclosure relates to a connector assembly comprising a port component having a main body portion. The port component may also include at least one projecting tab. A tubular adapter component may also be included which has at least one cutout section. A tubular sleeve is positioned over an end portion of the port component and is non-rotatable and non-removable relative to the port component. The tubular sleeve may include at least one flexible cam locking post projecting from an interior wall portion thereof and which is offset circumferentially from the at least projecting component. When the adapter component is slidably engaged over an end of the port component and within the tubular sleeve, and then rotated, the at least one cutout section and the projecting tab engage to prevent sliding withdrawal of the adapter component from the port component. The at least one flexible cam locking post also engages with the at least one cutout section to prevent rotational movement of the adapter component relative to the port component, thus preventing further rotation of the adapter component and removal of the adapter component from the port component.

In still another aspect the present disclosure relates to a method for forming a connector assembly. The method may comprise providing a port component having a main body portion. The method may also comprise providing a tubular adapter component, with at least one of the tubular adapter component or the port component having at least one cutout section and the other having a projecting tab. A tubular sleeve may be positioned on an end portion of the port component such that the tubular sleeve is not able to be removed from the port component or rotated relative to the port component. The tubular sleeve may be provided with at least one flexible cam locking post projecting from an interior wall portion thereof. The method may further involve slidably engaging the adapter component with an end of the port component. During this sliding movement the at least one cutout section and the projecting tab engage, and thereafter prevent sliding withdrawal of the adapter component from the port component. The at least one flexible cam locking post also engages with the at least one cutout section to thereafter prevent rotational movement of the adapter component relative to the port component, thus preventing removal of the adapter component from the port component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
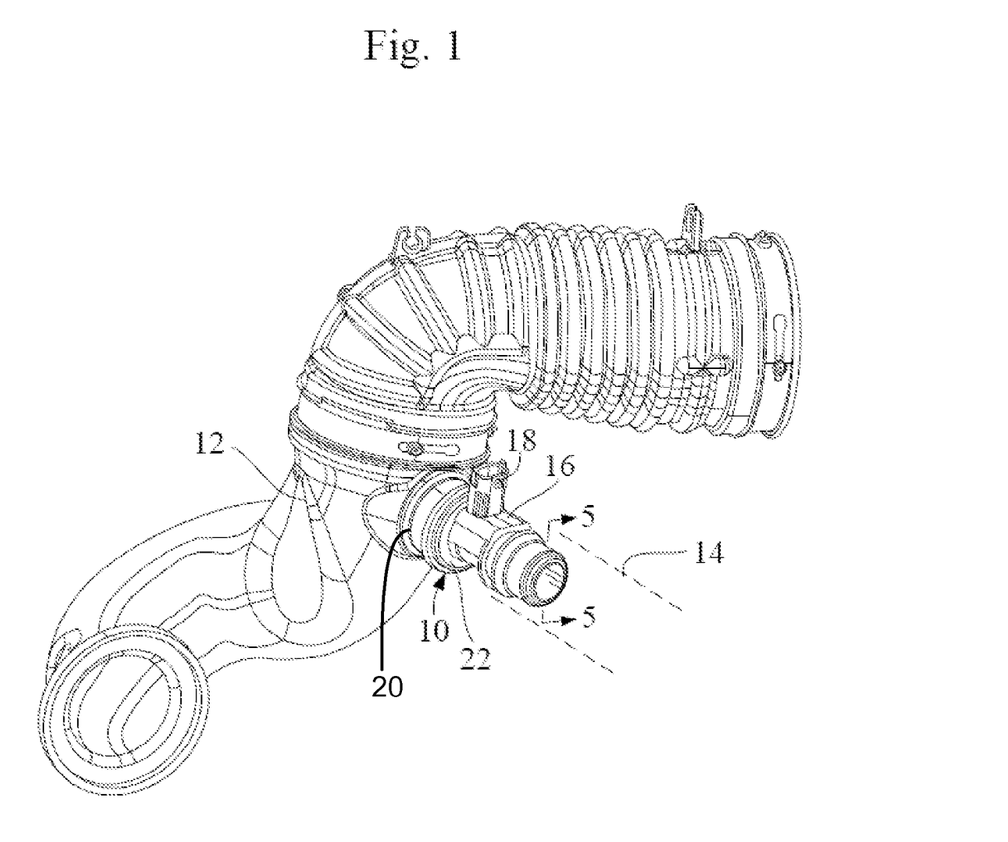
FIG. 1 is an environmental, perspective view of a tamper-resistant connector assembly according to one embodiment of the present disclosure, the tamper-resistant connector assembly being shown operatively connecting a heated port to a clean-side duct of a positive crankcase ventilation (PCV) circuit.

Referring to FIG. 1 there is shown a tamper-resistant connector assembly 10 (hereinafter simply "connector assembly" 10) in accordance with one example embodiment of the present disclosure. The connector assembly 10 in this example is interfaced to a clean side duct 12 of a vehicle emissions circuit and helps to form a flow path for a positive crankcase ventilation (PCV) circuit by interfacing the clean side duct 12 to a PCV hose 14. However, it will be appreciated that this is merely one example of how the connector assembly 10 may be employed. It is expected that the connector assembly 10 of the present disclosure is likely to find utility in a variety of applications, not necessarily limited to automotive applications, where a tamper-resistant connector needs to be used to interface two conduits which are in flow communication with one another.

In the example embodiment of FIG. 1 the connector assembly 10 includes a tubular, heated port component 16 having an integrally formed sensor housing 18. The sensor housing 18 is configured to accept and retain a sensor (not shown) therein that may be used to sense or monitor a gaseous fluid flowing through the connector assembly 10. A tubular adapter component 20 (hereinafter "adapter" 20) is secured to the heated port component 16 and retained thereto in part by a tubular sleeve component 22 (hereinafter "sleeve" 22) that is over-molded (i.e., insert molded) onto a portion of the heated port component. This feature will be described in greater detail in the following paragraphs.

The adapter 20, in one embodiment, may comprise a plastic (e.g., polypropylene) component which is secured such as by welding to the clean side duct 12 over an opening (not visible) in the clean side duct 12, during a previous assembly operation. Alternatively, the adapter 20 of the connector assembly 10 may be permanently secured to the clean side duct 12 such as by suitable adhesives or by thermal welding such as vibration welding, hot plate welding or laser welding or by other suitable means as is known to those skilled in the art.

Figure 2:
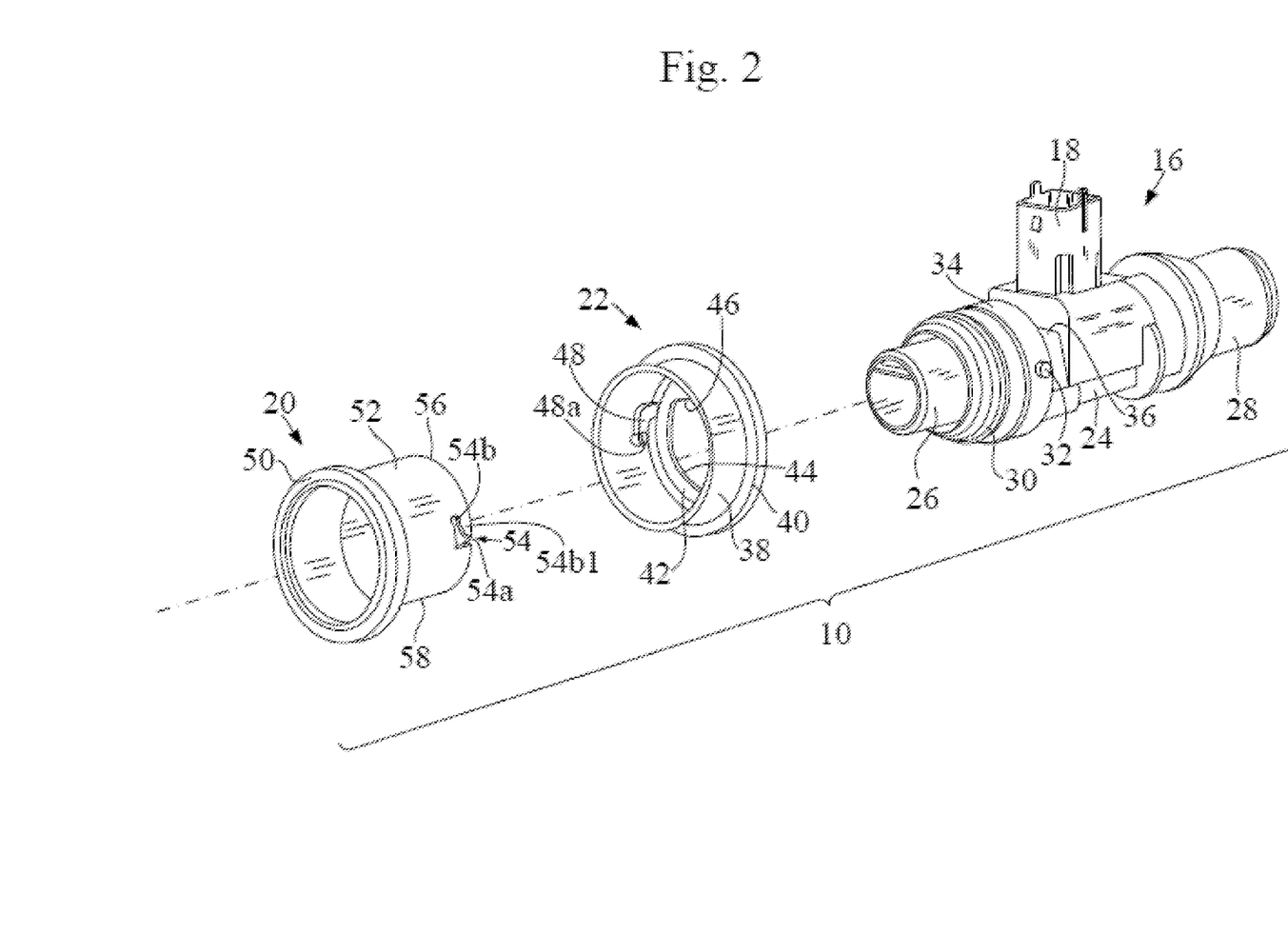
FIG. 2 is an exploded perspective view of the tamper-proof connector assembly of FIG. 1.

Referring to FIG. 2, the various components of the connector assembly 10 are illustrated in greater detail. The heated port component 16 includes a main body portion 24 from which the sensor housing 18 may be formed. In this example, the sensor housing 18 is in flow communication with the interior of the heated port component 16. The main body portion 24 also includes a first neck portion 26 and a second neck portion 28. The second neck portion 28 may be used to interface with a suitable fitting (not shown) associated with the PCV conduit 14 (FIG. 1). In the present example where the connector assembly 10 is used in a PCV circuit, the second neck portion 28 will typically be secured via another form of tamper-resistant or irremovable connector (not shown). The first neck portion 26 includes a circumferential groove 30 within which a seal element, such as a compressible O-ring (not shown), may be disposed. The main body portion 24 may also include a pair of projecting tabs 32 arranged 180 degrees from another on the main body portion 24 on a shoulder portion 34. In the illustration of FIG. 2 only one of the two projecting tabs 32 is visible. The main body portion further includes a flat surface 36, the function of which will be discussed in the following paragraphs.

Figure 4:
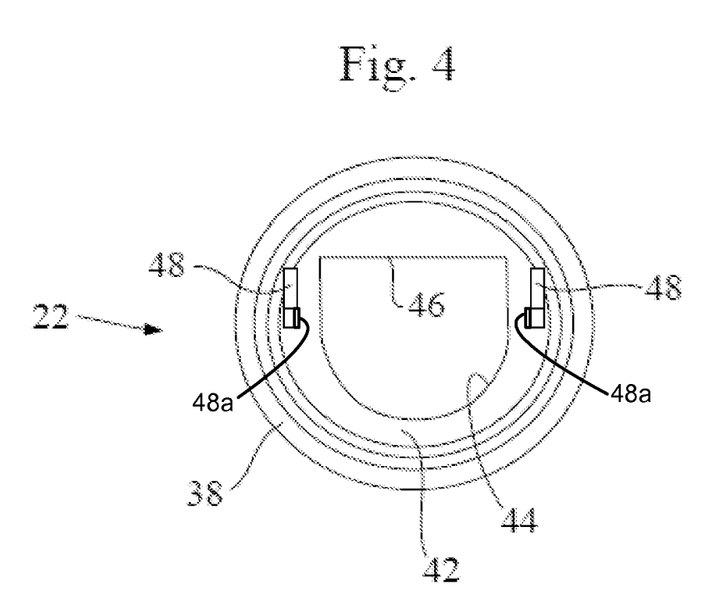
FIG. 4 is an end view of just the over molded sleeve to illustrate the two flexible cam locking posts that engage with the adaptor when the adaptor is fully inserted within sleeve.

With further reference to FIGS. 2 and 4, the sleeve 22 can also be seen in greater detail. The sleeve 22 may be made from any suitable materials. In one embodiment, the sleeve 22 is made from a high strength material, for example Polypropylene (without filling), which is extremely strong, well suited to use in high temperature applications, and resistant to exposure to various chemicals. The sleeve 22 has a circumferential neck portion 38 that projects from a flange 40. An inner wall 42 has a semi-circular cutout section 44 with a flat section 46. Projecting outwardly from the inner wall 42 is a pair of flexible cam locking posts 48 positioned about 180 degrees from another, and circumferentially offset slightly (typically by 5 to 30 degrees) from the projecting tabs 32 when the sleeve 22 is positioned on the heated port component 16. Each of the flexible cam locking posts 48 may include a projecting tab portion 48a. The flat section 46 of the sleeve 22, in combination with the flat surface 36 of the heated port component 16, ensures that the sleeve 22 is not able to rotate about the main body portion 24 of the heated port component 16 when the connector assembly 10 is fully assembled. The sleeve 22 in this example is over-molded on to the heated port component 16 such that it will be non-removable because of the presence of the shoulder portion 34.

With further reference to FIG. 2, the adapter 20 can be seen to include a flange 50 and a tubular neck portion 52. The neck portion 52 may include at least one keyed cutout section 54. In the embodiment illustrated, the neck portion 52 includes a pair of keyed cutout sections 54 at an edge thereof which are arranged 180 degrees from one another (only one being visible in FIG. 2). As illustrated, the keyed cutout sections 54 have first portions 54a and second portions 54b which cooperatively form a generally L-shaped configuration. It will be appreciated, however, that each of the keyed cutout sections 54 may alternatively only comprise the first portion 54a. The adaptor 20 may be made from a variety of suitably strong and durable materials, but in one example is made from Polypropylene with glass fiber filling.

Figure 3:
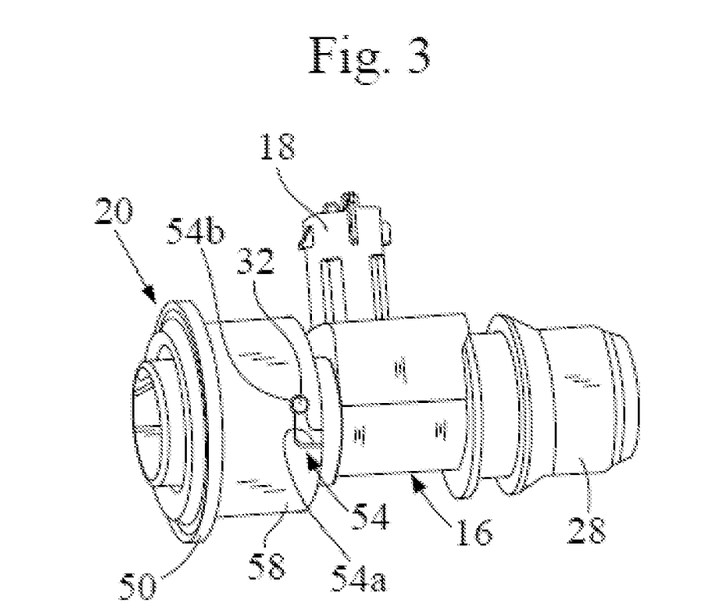
FIG. 3 is a perspective view of just the adapter component secured to the heated port component, with the sleeve having been omitted for clarity.

The first and second portions 54a and 54b further have dimensions which permit the projecting tabs 32 to engage therein as the neck portion 50 is slid over the shoulder portion 34 of the heated port component 16. When the neck portion 52 is initially slid over the shoulder portion 34 with the first portions 54a aligned with the projecting tabs 32, the projecting tabs 32 will engage in the first portions 54a. Then, rotating the adapter 20 a few degrees causes the projecting tabs 32 to engage within the second portions 54b. The second portions 54b may each have a small bump 54b1 that forms a detent. In this manner, after the projecting tabs 32 are engaged in the first portions 54a of the cutouts 54 and the adaptor 20 is rotated, some small additional degree of resistance will be felt before the projecting tabs 32 snap into the second portions 54b of the cutout sections 54. The adapter 20 is shown secured to the heated port component 16 in FIG. 3 but without the sleeve 22 present, simply for the purpose of illustration.

With continuing reference to FIG. 2, the sleeve 22 operates to ensure that once the connector assembly 10 is fully assembled it cannot be dissembled. This is accomplished by the flexible cam locking posts 48. The flexible cam locking posts 48 are positioned to extend from the inner wall 42 such that as an end portion 56 of the adapter 20 is slid over the shoulder portion 34 and inside the neck portion 38 of the sleeve 22, the flexible cam locking posts will be urged radially outwardly slightly as they contact the end portion 56 of the neck portion 52, and then momentarily ride onto an outer surface 58 of the neck portion 52 as the neck portion is fully seated against the inner wall 42.

As the adapter 20 is rotated slightly to engage the projecting tabs 32 in the second portions 54b of the cutout sections 54, the projecting tab portions 48a of the flexible cam locking posts 48 will snap into engagement within the first portions 54a of the cutout sections 54. Since the flat section 46 of the inner wall 42 prevents the sleeve 22 from rotating, it will not thereafter be possible to simply rotate the sleeve 22 to disengage the sleeve 22 from the adapter 20. And furthermore, since the sleeve 22 is permanently retained on the heated port component 16 because of the shoulder portion 34, there is no way to remove the sleeve 22 from the heated port component 16. At this point the adapter 20 will be irremovably retained to the heated port component 16 by the sleeve 22. Moreover, there is no way for an individual to readily separate the heated port component 16 from the adapter 20 without physically damaging or destroying the connector assembly 16.

Figure 5:
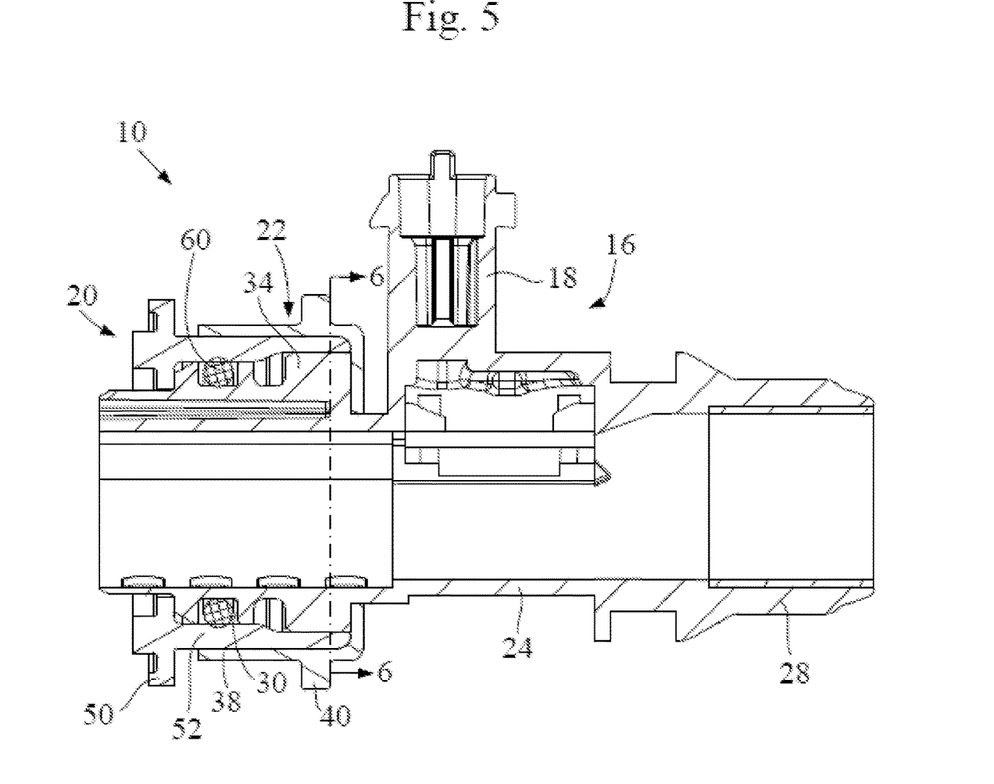
FIG. 5 is a cross sectional view of the tamper-resistant connector assembly shown in FIG. 1 taken in accordance with section line 5-5 in FIG. 1, showing the tamper-resistant connector assembly fully assembled onto the clean side duct.
Figure 6:
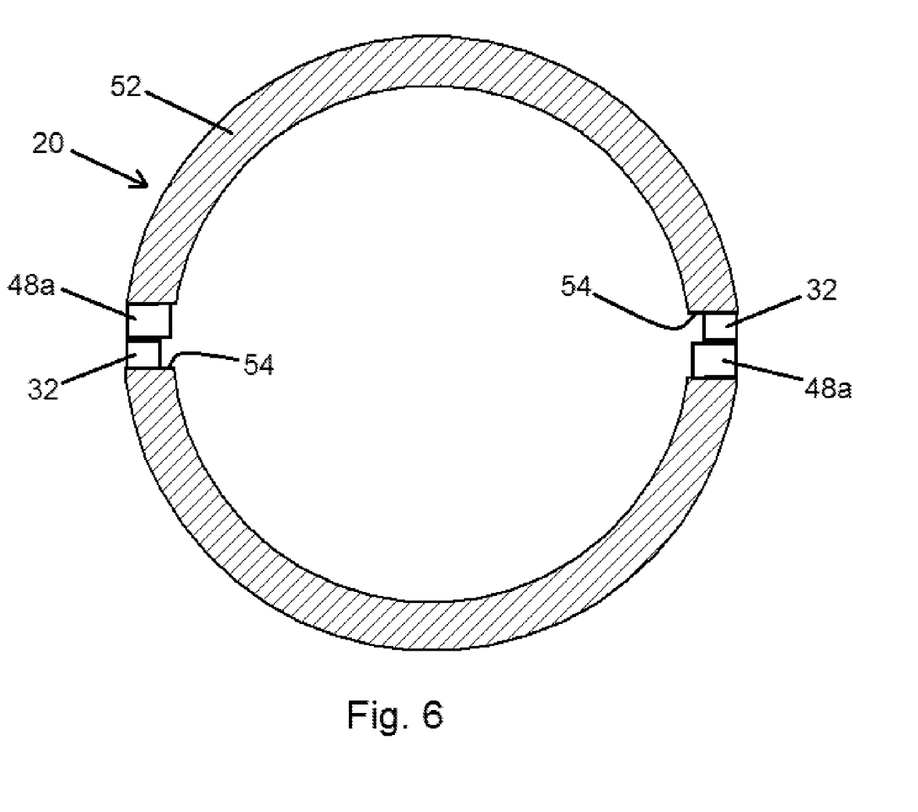
FIG. 6 is a cross sectional drawing in accordance with section line 6-6 in FIG. 5 showing the projecting tabs and the flexible cam locking posts engaged within the cutout sections on the adapter.

Referring to FIG. 5, the fully assembled connector assembly 10 is shown in cross section. An O-ring 60 may be positioned in the circumferential groove 30 of the heated port component 16 prior to assembly of the connector assembly 10. The O-ring 60 helps to maintain a fluid tight coupling between the heated port component 16 and the adapter 20. In FIG. 6 the engagement of both the projecting tab portions 48a and the projecting tabs 32 within the cutout sections 54 can be seen.

Figure 7:
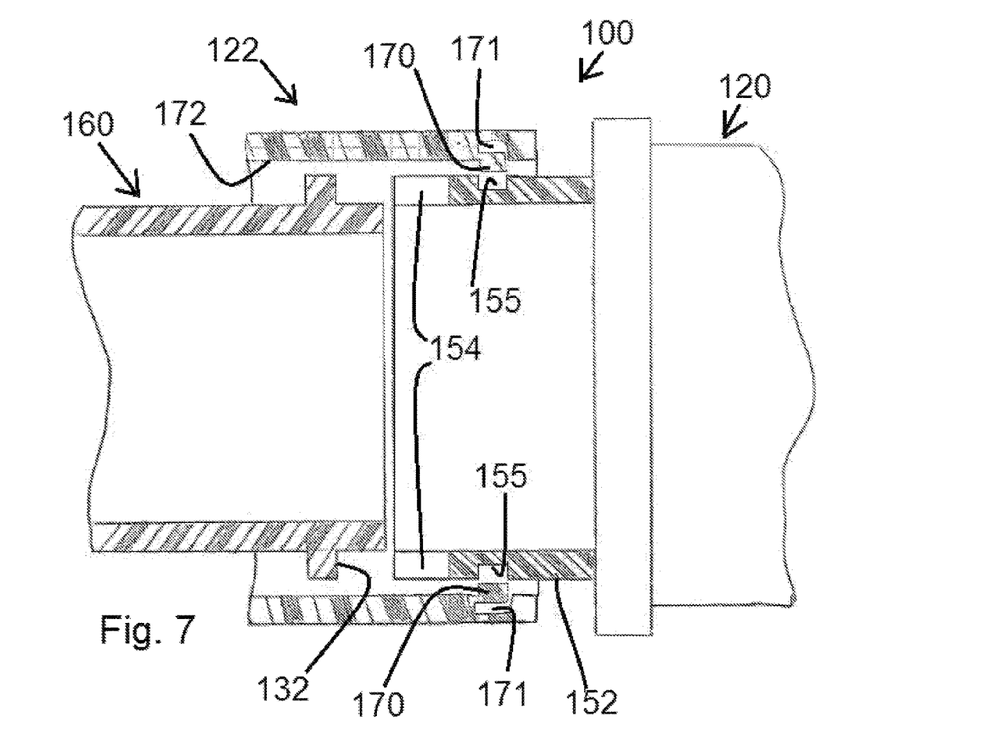
FIG. 7 is a high level cross sectional view of another embodiment of the connection assembly which enables an adaptor component to be secured to a heated port component without any twisting action being required during the assembly process.

FIG. 7 shows a connector assembly 100 in accordance with another embodiment of the present disclosure. In FIG. 7 the components in common with those of the assembly 10 have been denoted with reference numbers increased by 100 over those used to describe the assembly 100.

The connector assembly 100 enables non-releasable engagement between a heated port component 160 and an adaptor 120 without any twisting motion of the adaptor 120. To achieve this the adaptor 120 includes a tubular neck portion 152 with a pair of straight slots 154. The tubular neck portion 152 also includes a pair of recesses 155. An overmolded sleeve 122, which is disposed on the heated port component in the same manner as described in connection with the 10, however, includes a pair of tabs 170 projecting from an inner wall portion 172. The adaptor 120 is attached to the heated port component 160 by sliding it on the component 160 while the straight slots 154 are aligned with projecting tabs 132 on the component 160. As the straight slots 154 engage the projecting tabs 132, tabs 170 engage within the recesses 155. This prevents the adaptor 120 from simply being pulled straight back off from the heated port component 160 once it has been attached to the heated port component 160. To aid in inserting the adaptor 120 the tabs 170 on the overmolded component 122 may be formed as flexible tabs with a relief area 171 to permit the tabs 170 to be flexed radially inwardly as the tubular neck portion 152 is inserted within the overmolded sleeve 122.

The connector assembly 10 thus forms a means by which a coupling can be made between two components using a simple sliding and twist locking action. The locking action prevents separation of the components after the components of the connector assembly are assembled together. This prevents individuals from disassembling the connector assembly 10 and bypassing an airflow or fluid flow circuit that the connector assembly is helping to form. While the example connector assembly 10 disclosed herein is expected to find utility in a wide variety of applications, it is anticipated that the connector assembly 10 will likely find particular utility in connection with emissions circuits on motor vehicle engines, and particularly on PCV circuits. A significant advantage of the connector assembly 10 is that it does not require any special tools for its assembly, and is comprised of only a few independent component parts. The connector assembly 10 can thus be manufactured cost effectively, and is also highly resistant, heat, chemicals and harsh operating environments.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A connector assembly comprising:
a port component having a main body portion;
a tubular adapter component, at least one of the tubular adapter component or the port component having at least one cutout section and the other having a projecting tab,
wherein the projecting tab is formed on the port component;
a tubular sleeve configured to be positioned on an end portion of the port component and non-rotatable and non-removable relative to the port component, the tubular sleeve including at least one flexible cam locking post projecting from a wall portion thereof; and
wherein when the adapter component is slidably engaged with the port component, the at least one cutout section and the projecting tab prevent sliding withdrawal of the adapter component from the port component, and the at least one flexible cam locking post also engages with the at least one cutout section to prevent rotational movement of the adapter component relative to the port component, thus preventing removal of the adapter component from the port component.

2. The connector assembly of claim 1, wherein
the at least one cutout section is formed on a neck portion of the adapter component.

3. The connector assembly of claim 1, wherein
rotational movement of the adapter component, after being slidably inserted on the port component and engagement of the projecting tab within the cutout portion, causes the flexible cam locking post to engage within the cutout portion, to prevent removal of the adapter component from the port component.

4. The connector assembly of claim 1, wherein the tubular sleeve includes an inner wall having a flat section, and wherein the main body portion of the port component includes a flat surface, the flat section and the flat surface cooperatively preventing rotation of the tubular sleeve relative to the port component.

5. The connector assembly of claim 1, wherein
the tubular sleeve is over-molded onto the port component so as not to be separable from the port component.

6. The connector assembly of claim 1, wherein
the port component includes a sensor fitting for accepting an external sensor.

7. The connector assembly of claim 1, wherein
the adapter component includes a neck portion on which the cutout section is formed, and
wherein the neck portion of the adapter component fits inside of a neck portion of the tubular sleeve when the adapter component is attached to the port component.

8. The connector assembly of claim 1, wherein
the cutout section forms a generally L shaped cutout portion having a first portion and a second portion, the first portion receiving the projecting tab from the port component and the second portion receiving a portion of the flexible cam locking post.

9. The connector assembly of claim 1, wherein
the projecting tab and the flexible cam locking post are circumferentially offset from one another.

10. A connector assembly, comprising:
a port component having a main body portion;
a tubular adapter component, at least one of the tubular adapter component or the port component having at least one cutout section and the other having a projecting tab;
a tubular sleeve configured to be positioned on an end portion of the port component and non-rotatable and non-removable relative to the port component, the tubular sleeve including at least one flexible cam locking post projecting from a wall portion thereof;
wherein when the adapter component is slidably engaged with the port component, the at least one cutout section and the projecting tab prevent sliding withdrawal of the adapter component from the port component, and the at least one flexible cam locking post also engages with the at least one cutout section to prevent rotational movement of the adapter component relative to the port component, thus preventing removal of the adapter component from the port component,
wherein the port component includes a circumferential groove, and
wherein the connector assembly further comprises an O-ring disposed within the circumferential groove.

11. The connector assembly of claim 10, wherein
the projecting tab is formed on the port component.

12. A connector assembly comprising:
a port component having a main body portion including at least one projecting tab;
a tubular adapter component having at least one cutout section;
a tubular sleeve positioned over an end portion of the port component and non-rotatable and non-removable relative to the port component, the tubular sleeve including at least one flexible cam locking post projecting from an interior wall portion thereof and offset circumferentially from the at least one projecting tab; and
wherein when the adapter component is slidably engaged over an end of the port component and within the tubular sleeve, and then rotated, the at least one cutout section and the projecting tab engage to prevent sliding withdrawal of the adapter component from the port component, and the at least one flexible cam locking post also engages with the at least one cutout section to prevent rotational movement of the adapter component relative to the port component, thus preventing further rotation of the adapter component and removal of the adapter component from the port component.

13. The connector assembly of claim 12, wherein
the adapter component includes a neck portion, and wherein the cutout section is disposed on the neck portion.

14. The connector assembly of claim 13, wherein
the cutout section comprises an L-shaped cutout section having a first portion and a second portion.

15. The connector assembly of claim 13, wherein
one of the projecting tab and the flexible cam locking post engages in the first portion of the L-shaped cutout section, and
the other one of the projecting tab and the flexible cam locking post engages in the second portion of the L-shaped cutout section.

16. The connector assembly of claim 12, wherein
the tubular sleeve includes an inner wall having an opening with a flat section, and
wherein the main body portion of the port component includes a flat surface, the flat section and the flat surface cooperatively preventing rotation of the tubular sleeve relative to the main body portion of the port component.

17. The connector assembly of claim 12, wherein
the main body portion of the port component includes a circumferential groove, and
wherein the connector assembly includes an O-ring disposed in the circumferential groove for providing a substantially air tight seal between the adapter component and the port component.

18. The connector assembly of claim 12, wherein
the adapter component is made from polypropylene and wherein the port component is made from polyamide.

19. A method for forming a connector assembly, comprising:
providing a port component having a main body portion;
providing a tubular adapter component, with at least one of the tubular adapter component and the port component having at least one cutout section and the other having a projecting tab;
forming a tubular sleeve with a flat section on an internal wall portion thereof;
forming a flat surface on the main body portion of the port component;
positioning the tubular sleeve on an end portion of the port component such that the tubular sleeve is not able to be removed from the port component or rotated relative to the port component, the tubular sleeve being provided with at least one flexible cam locking post projecting from an interior wall portion thereof; and
slidably engaging the adapter component with an end of the port component; and
using the flat section and the flat surface to prevent rotational movement of the tubular sleeve relative to the port component,
wherein the at least one cutout section and the projecting tab engage to prevent sliding withdrawal of the adapter component from the port component, and the at least one flexible cam locking post also engages with the at least one cutout section to prevent rotational movement of the adapter component relative to the port component, thus preventing removal of the adapter component from the port component.

* * * * *